United States Patent [19]

Lane et al.

[11] 3,920,284
[45] Nov. 18, 1975

[54] MONITORING CIRCUITRY FOR A SKID CONTROL SYSTEM

[75] Inventors: Eneas James Lane, Highland; David Thomas Klien; Steven Geppert, both of Southfield, all of Mich.

[73] Assignee: Eaton Corporation, Cleveland, Ohio

[22] Filed: May 10, 1974

[21] Appl. No.: 468,929

[52] U.S. Cl............... 303/21 AF; 324/51; 324/73 R; 340/52 B
[51] Int. Cl.² ............................................ B60T 8/00
[58] Field of Search ............. 303/21; 318/563, 565; 324/34 R, 51, 57 R, 62 K, 73 R, 133, 140 R; 340/52 B, 248 A, 248 B

[56] References Cited
UNITED STATES PATENTS

| | | | |
|---|---|---|---|
| 3,578,819 | 5/1971 | Atkins............................. | 303/21 BE |
| 3,620,577 | 11/1971 | Neisch et al. .................... | 303/21 EB |
| 3,680,923 | 8/1972 | Peterson et al. ................. | 303/21 AF |
| 3,825,307 | 7/1974 | Carr et al. ....................... | 303/21 AF |
| 3,838,891 | 10/1974 | Hamelin .......................... | 303/21 AF |
| 3,841,712 | 10/1974 | Syria .............................. | 303/21 AF |

*Primary Examiner*—Trygve M. Blix
*Assistant Examiner*—Stephen G. Kunin
*Attorney, Agent, or Firm*—Teagno & Toddy

[57] ABSTRACT

A skid control system serves to control the operation of a braking system for applying braking forces to a pair of spaced apart, independently rotatable vehicle wheels. The system employs a brake control device which responds to a skid signal for controlling the braking system to release the braking forces on the wheels. Wheel speed signals are provided by sensor circuitry and are representative of the wheel speeds of the first and second wheels. Logic circuitry utilizes the wheel speed signals to determine an incipient skid condition of at least one of the wheels and, in dependence upon the determination, provides a skid signal. Monitoring circuitry is provided for use with such a skid control system for inhibiting the operation of the system. The wheel speed sensing circuits are monitored for sensor continuity and a control signal is provided when an open circuit condition is detected. This control signal is employed to disable the skid control system. Monitoring circuitry is also provided for monitoring the brake control, such as a valve solenoid, and for disabling the system when a determination is made of either an open or shorted solenoid coil. Monitoring circuitry is also provided for monitoring the time duration that a skid signal is provided by the skid signal logic circuitry and disabling the skid control system when the time duration of the skid signal is excessive.

12 Claims, 3 Drawing Figures

MONITORING CIRCUITRY FOR A SKID CONTROL SYSTEM

This invention relates to the art of skid control systems for controlling braking forces applied to the wheels on a vehicle having a braking system and, more particularly, a monitoring circuit for monitoring various operational aspects of the skid control system and disabling the skid control system when the monitored characteristics are not within prescribed limits.

Skid control systems are known in the art for use with vehicles having at least a pair of spaced apart, independently rotatable wheels together with a braking system for applying braking forces to the wheels. Such systems also include a brake control, which typically includes a valve solenoid which, when actuated, acts upon the vehicle's brake control system to release the braking forces. This valve solenoid is, in turn, electrically energized by a valve driving circuit in response to receipt of a skid signal. The skid signal is provided by a logic circuit which receives the wheel speed signals and utilizes these signals to determine an incipient skid condition of at least one of the wheels and if so, provides a skid signal. Consequently then, it is exceedingly important to the operation of the skid control system that the wheel sensor circuitry maintains continuity. It is also important that the valve solenoid coil should not exhibit either an open circuit or a shorted circuit condition. Still further, if a skid signal representative of an incipient skid condition is present for an unduly long time period, this may be indicative of a malfunction in the control system. In the event any such faulty operating condition takes place, then either a warning indication should be provided or the skid control system should be effectively deactivated.

It is therefore an object of the present invention to provide monitoring circuitry for monitoring the wheel sensor circuits used in such a skid control system and provide an indication upon loss of circuit continuity.

It is a still further object of the present invention to provide circuitry for monitoring a valve solenoid coil in such a system and provide an output indication if either a short circuit or open circuit condition is detected.

It is a still further object of the present invention to provide improved circuitry for detecting whether a skid signal is present for an excessively long time.

The present invention contemplates the provision of a skid control system for use with a vehicle having at least first and second spaced apart, independently rotatable wheels to be controlled together with a braking system for applying braking forces to the wheels. It is further contemplated that a brake control responds to a skid signal for controlling the braking system to release the braking forces on the wheels. First and second wheel speed sensors provide wheel speed signals respectively representative of the wheel speeds of the first and second wheels. A skid signal is obtained from a logic circuit which utilizes the first and second wheel speed signals and determines therefrom the existence of an incipient skid condition of at least one of the wheels and provides a skid signal.

In accordance with one aspect of the present invention, a test current is continuously applied to each wheel speed sensor coil to establish a DC voltage thereacross. If the DC voltage varies in magnitude by a predetermined amount, a circuit responds to this condition to disable the skid system.

In accordance with another aspect of the present invention, the brake control employs a valve solenoid coil which, when energized, acts on the braking system to release braking forces. The valve solenoid coil is, in turn, energized by a valve driver circuit in response to a skid signal. In this aspect of the invention, a test current is applied to the valve solenoid coil to develop a DC test voltage thereacross and which is of a magnitude insufficient to energize the coil to relieve braking forces. If the test voltage changes sufficiently in magnitude, representative of an erroneous condition, such as open circuit or short circuit, the valve driver circuit will be disabled.

In accordance with a still further aspect of the present invention, the valve driver circuit is disabled in response to an erroneous condition only after a predetermined time delay has ensued from the detection of the erroneous condition.

BRIEF DESCRIPTION OF THE DRAWINGS

The foregoing and other objects and advantages of the invention will become more readily understood from the following description of the preferred embodiment of the invention taken in conjunction with the accompanying drawings which are a part hereof and wherein.

GENERAL DESCRIPTION

Figure 1:
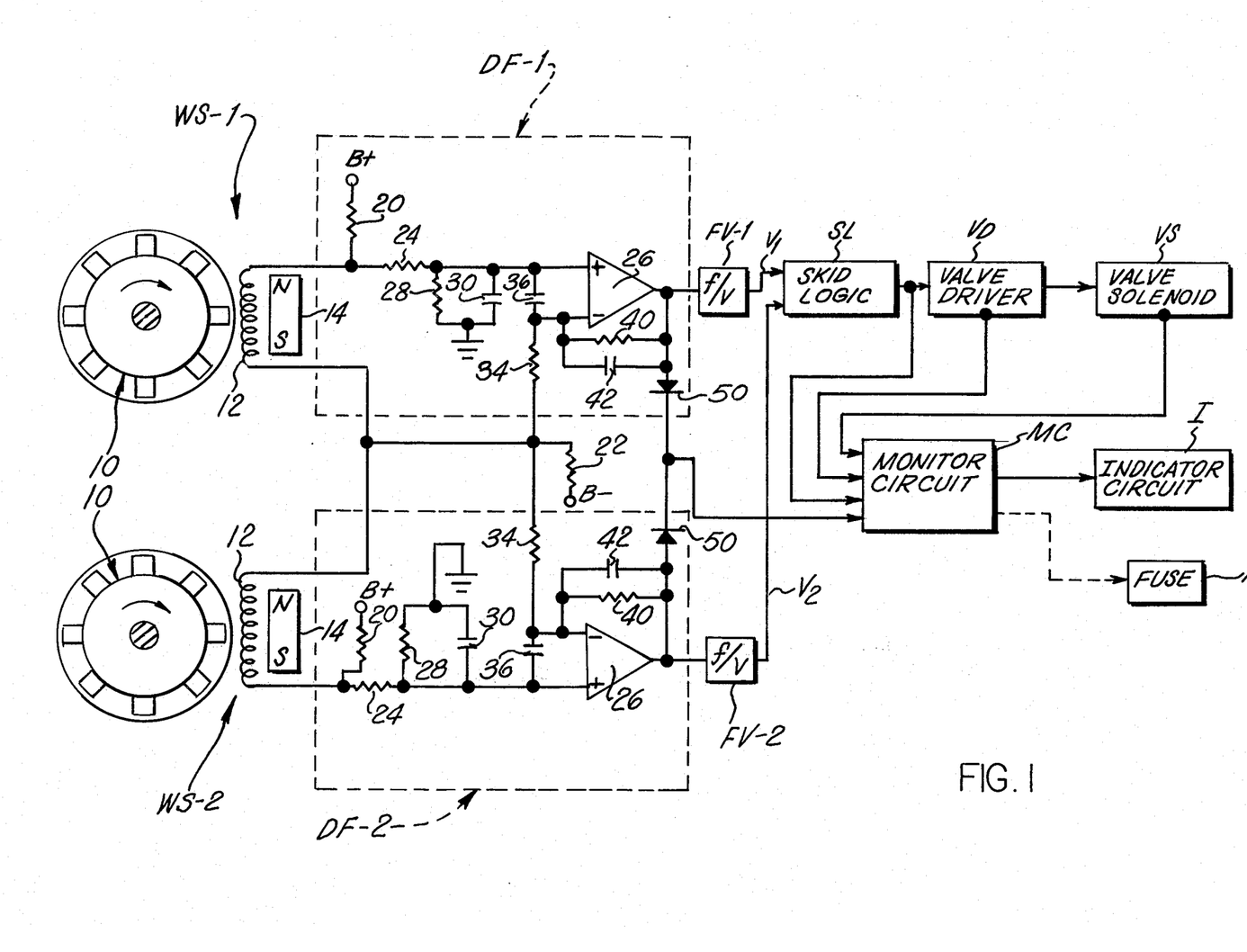
FIG. 1 is a block diagram illustration of one application of the skid control system monitoring circuit of the present invention.

Referring now to the drawings wherein the showings are for purposes of illustrating a preferred embodiment of the invention only, and not for purposes of limiting same, FIG. 1 is a block diagram illustration showing the manner in which the skid control monitoring circuitry may be applied to a skid control system. The skid control system illustrated includes wheel speed sensors WS-1 and WS-2 for respectively sensing the wheel speeds of two wheels on a vehicle being controlled. The two wheels may, for example, be two independently rotatable wheels mounted on the same or different axles. Although various sensors may be employed for sensing wheel speed, it is preferred that each wheel speed sensor take the form of a tachometer generator or reluctance transducer for purposes of developing an alternating signal having a frequency which is proportional to the angular velocity of the associated vehicle wheel. If desired, the frequency signal may be shaped for use as digital pulses for use by digital skid logic circuitry. However, in the embodiment of the invention described herein, each frequency signal is shaped and converted into an analog DC signal exhibiting a magnitude proportional to the frequency and hence, to the angular velocity of the associated wheel. As will be described in greater detail hereinafter, the frequency signal obtained by wheel sensor WS-1 is conditioned or shaped by a differential input filter DF-1 so that the alternating signal exhibits a constant magnitude with variations in angular velocity and this alternating signal is then converted by a frequency-to-voltage converter FV-1 to obtain an analog DC signal V-1. This signal may be a positive voltage signal having a magnitude proportional to wheel velocity. Similarly, the frequency signal obtained by sensor WS-2 is conditioned or shaped by an input filter DF-2, which is identical to filter DF-1, and then converted by a frequency-to-voltage converter FV-2 to obtain a DC analog signal $V_2$ having a magnitude proportional to the angular velocity of the second wheel.

The wheel speed signals $V_1$ and $V_2$ are applied to a skid logic circuit SL which includes circuitry, known in the art, for determining from these two wheel speed signals whether either or both is representative of an incipient skid condition and if so, the skid logic circuit provides a skid signal. The skid logic circuit may, for example, take the form as illustrated and described in our copending U.S. application Ser. No. 326,676 filed on Jan. 26, 1973, in copending divisional application Ser. No. 527,246, filed on Nov. 26, 1974, and in continuation application Ser. No. 528,218, filed on Nov. 29, 1974, now abandoned. The skid signal may take the form of a positive DC voltage signal which has a time duration dependent on the duration of the faulty condition representative of an incipient skid condition. This skid signal is, in turn, applied to a valve driver circuit VD which responds to the skid signal to energize a valve solenoid VS which serves to release the vehicle braking forces for a time duration corresponding with that of the skid signal and thereby prevent wheel lockup.

Each of the wheel sensors WS-1 and WS-2 is constructed in the same fashion and, for example, may take the form as illustrated in FIG. 1 with respect to the sensor WS-1. Here the sensor incorporates a rotor 10 and a stator 12. The rotor is schematically illustrated in this figure and takes the form of a multi-tooth ferromagnetic rotor with the rotor being suitably attached to a vehicle wheel so as to rotate therewith. As the wheel rotates, the plurality of teeth sequentially pass through and interrupt a magnetic field, the source of which is schematically illustrated herein as being a permanent magnet 14, causing a fluctuating voltage to be induced in the sensor coil, 12. This fluctuating voltage cyclically varies in magnitude at a frequency proportional to the angular velocity of the vehicle wheel being monitored. However, this frequency signal will vary in magnitude somewhat with increased vehicle velocity. Each of the differential filters DF-1 and DF-2 serves to condition its associated variable input signal to provide a frequency signal which is a constant level AC signal but of a frequency corresponding with the frequency of the induced signal in sensor coil 12 of the associated wheel speed sensor WS-1 or WS-2. Each of these differential input filters DF-1 and DF-2 is constructed in an identical manner and this construction is set forth below with reference to filter DF-1.

The differential input filter DF-1 includes a resistor 20 connected between a B+ voltage supply source and one end of the sensing coil 12 of wheel sensor WS-1 with the other end of that coil being connected through a resistor 22 to be B− voltage supply source. Resistor 24 is connected from the junction of resistor 20 and one end of coil 12 to the non-inverting input of an operational amplifier 26. A parallel RC circuit including resistor 28 and capacitor 30 is connected between the non-inverting input of operational amplifier 26 and electrical ground. The junction between resistor 22 and the other end of sensor coil 12 is connected by a resistor 34 to the inverting input of operational amplifier 26. A capacitor 36 is connected across the operational amplifier. A feedback network is connected between the output of the operational amplifier and the inverting input thereof. This RC feedback network is comprised of a resistor 40 and a capacitor 42 connected together in parallel. This circuitry, which constitutes the differential input filter DF-1, serves as high frequency attenuator and converts the variable level AC input signal induced in coil 12 into a constant level AC signal which is then applied to the frequency-to-voltage converter FV-1. Amplifier 26 exhibits an AC gain as determined by the values of capacitors 30 and 42 and resistors 24, 34, 28 and 40. The operation involving this circuitry which ensues in conjunction with the sensor continuity monitoring circuit will be described in greater detail hereinafter.

MONITORING CIRCUITRY

In accordance with the present invention, a monitoring circuit MC monitors various operational characteristics of the skid control system and effectively disables the skid control system upon detection of a faulty condition. One input to the monitoring circuit MC is taken from the junction of diodes 50 in the differential input filter circuits DF-1 and DF-2 for purposes of monitoring the electrical continuity of the wheel sensors WS-1 and WS-2 respectively. Another input to the monitor circuit MC is a skid control signal obtained from the skid logic circuit SL. Another input to the monitor circuit MC is taken from the valve driver circuit VD. A still further input to the monitor circuit MC is taken from the valve solenoid VS. The circuitry and operational characteristics involved are described in greater detail hereinafter with respect to one embodiment of the monitoring circuit as shown in FIG. 2 and a second embodiment thereof as shown in FIG. 3.

Figure 2:
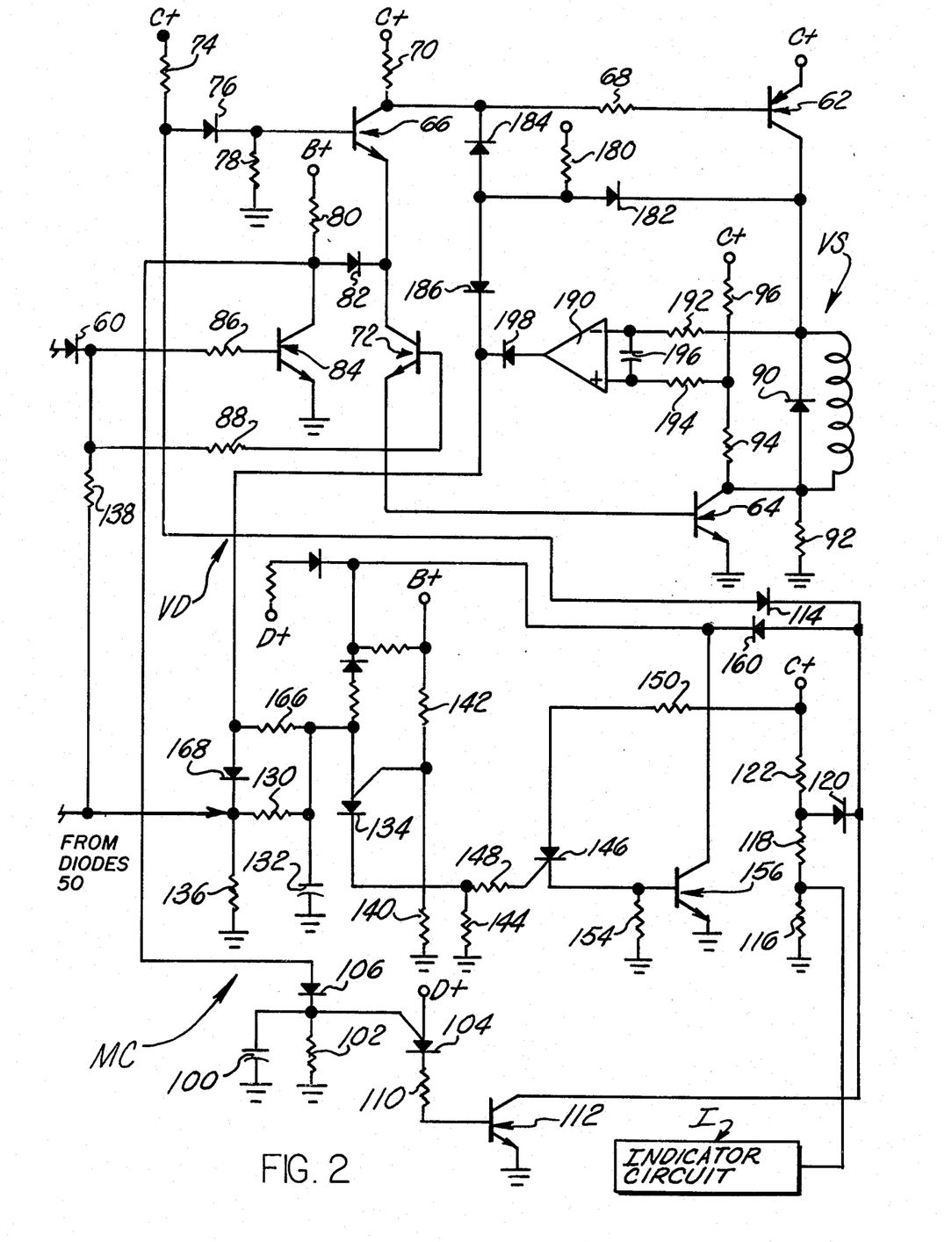
FIG. 2 is a schematic illustration of one embodiment of the skid control monitoring system.
Figure 3:
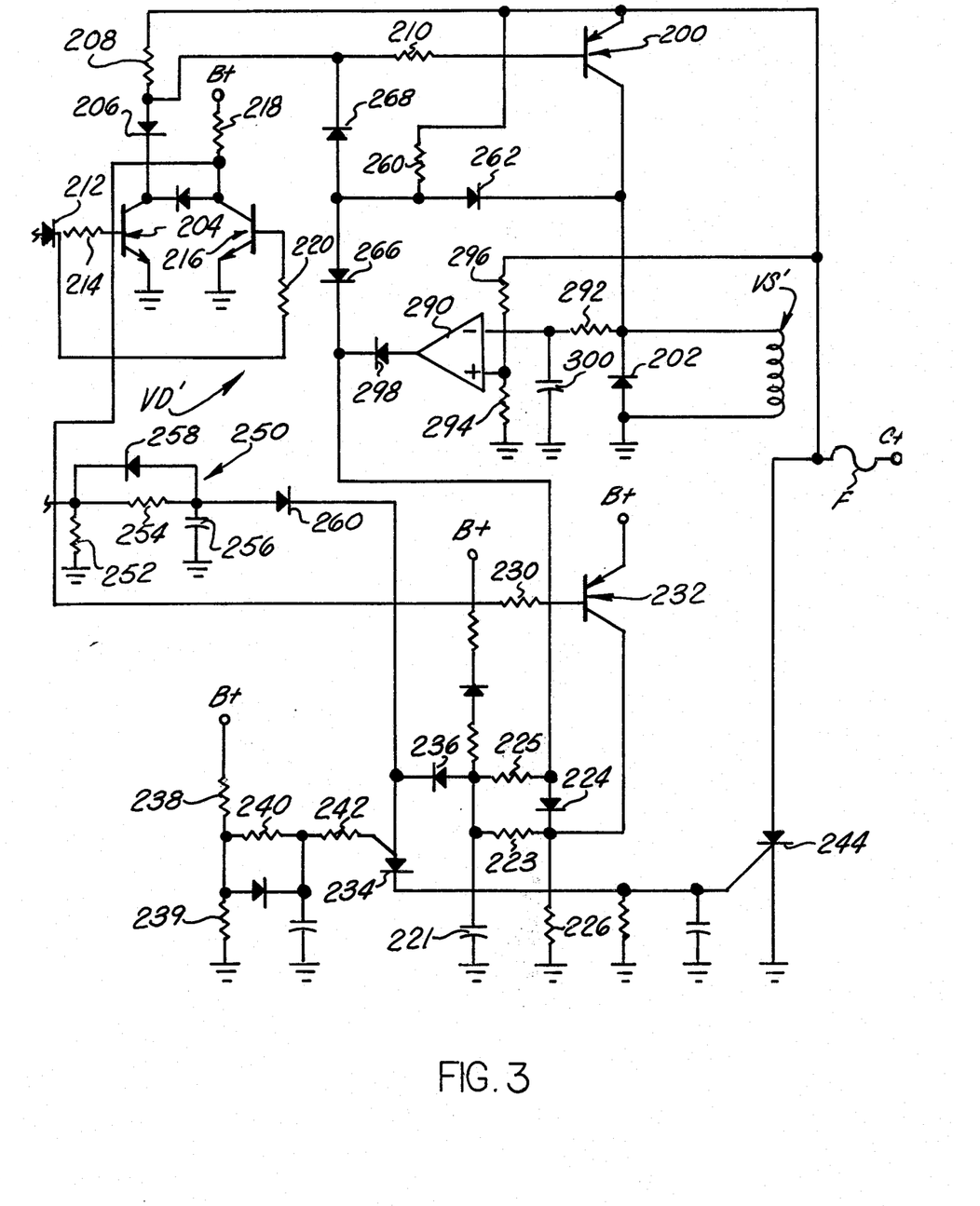
FIG. 3 is a schematic circuit diagram illustrating a second embodiment of the skid control monitoring system.

Monitor Circuit of FIG. 2

Reference is now made to FIG. 2 which illustrates the circuitry employed in the valve driver VD, valve solenoid VS, and the monitor circuit MC of a first embodiment of the invention. The valve driver circuit VD receives a positive skid signal through a diode 60 from the skid control logic circuit SL (FIG. 1) and then energizes the valve solenoid VS to provide brake release. The valve solenoid is energized for a time duration dependent upon the duration of the skid signal.

The valve driver circuit VD is illustrated in the upper portion of FIG. 2 to which reference is now made. This circuit includes a PNP power transistor 62 and an NPN power transistor 64. Both of these transistors must be conducting to energize the valve solenoid VS. An NPN transistor 66 has its collector connected by means of a resistor 68 to the base of transistor 62. The collector of transistor 66 is connected through a resistor 70 to a C+ voltage supply source and the emitter thereof is connected to the collector of a logic control transistor 72.

Transistor 66 is forward biased by a circuit including a resistor 74, a diode 76 and a resistor 78. Resistor 74 is connected to a C+ voltage supply source so as to provide voltage through diode 76 across resistor 78 and thereby provide positive biasing voltage to the base of transistor 66. Control transistor 72 has its collector to emitter path connected in series with the collector to emitter path of transistor 66 and is normally held in a non-conductive condition. A resistor 80 is connected in series with the diode 82 between a B+ voltage supply source and the collector electrode of transistor 72. The junction of resistor 80 and diode 82 is connected to the collector of another control transistor 84. A diode 60 serves to receive a positive skid signal from the skid control logic circuit SL and route the skid signal through a resistor 86 to the base of transistor 84 and through a resistor 88 to the base of transistor 72. Consequently then, upon receipt of such a skid signal, transistors 72 and 84 are biased into conduction and current flows from the C+ voltage supply source through transistor 62, resistor 68 and through transistor 66 and thence through the collector to emitter path of transistor 72 to provide base drive current for power transistors 62 and 64. Current will flow from the C+ voltage supply source through the emitter to collector path of power transistor 62 and, thence, through the solenoid coil VS and through the collector to emitter path of power transistor 64 to ground.

When the skid signal is removed, the power transistors are turned off. A diode 90 is connected across the solenoid coil to absorb the fly back voltage. A resistor 92 is connected across the collector to emitter circuit of transistor 64 and the collector of this transistor is connected through series connected resistors 94 and 96 to a C+ voltage supply source. Upon a detection of a faulty monitored condition, the monitoring circuitry will remove the base drive current for transistor 66, causing both power transistors 62 and 64 to turn off.

Excessive Skid Signal

The monitor circuit MC of FIG. 2 employs two skid signal disable timing circuits; namely, a short time disabling circuit and a long time disabling and latch off circuit. The short time circuit times a short delay (such as 2.0 seconds) and then disables the skid control system by turning off transistor 66 which, in turn, turns off power transistors 62 and 64, preventing energization of the solenoid VS. The long time circuit times a somewhat longer time duration of a skid signal (such as on the order of 10.0 seconds) and then disables the skid system and latches it off, requiring a reset operation. The long time and short time circuits and the operation involved are described in detail below.

The short time circuit is illustrated in the lower portion of FIG. 2 and includes an RC timing circuit comprised of capacitor 100 and resistor 102 connected in parallel between ground and the gate of a unijunction transistor 104 having its anode connected to a D+ voltage supply source. The gate of this transistor is also connected through a diode 106 to the junction of the collector of transistor 84 and resistor 80 so as to reference the gate of the transistor to a potential approaching that of the B+ voltage supply source. Since the D+ voltage supply source is less than that of a B+ voltage supply source, transistor 104 is in a non-conducting condition when transistors 72 and 84 are non-conducting. However, when a skid signal is received, transistors 72 and 84 in the valve driver section VD are turned on to thereby remove the B+ reference voltage for the gate of transistor 104. This removes the voltage applied to capacitor 100, permitting this capacitor to discharge through resistor 102. When the capacitor has discharged sufficiently, the gate voltage of transistor 104 will drop below the level of the anode voltage and the transistor will conduct.

When transistor 104 is conducting, current will flow through its anode to cathode circuit and thence through a resistor 110 to provide base drive current to turn on an NPN transistor 112. The time delay required to turn transistor 112 on is on the order of 2.0 seconds. When this transistor is on, a path is completed for current to flow from a C+ voltage supply source, in the valve driver section VD, through resistor 74 and thence through a diode 114 and through the collector to emitter path of transistor 112 to ground. This removes the base drive for transistor 66 in the valve driver section, causing this transistor to be turned off. When the base drive for transistor 66 is removed, this turns off power transistors 62 and 64, preventing energization of the valve solenoid VS. Conduction of transistor 112 also grounds the junction between the resistors 116 and 118 through a diode 120. Normally, there is a relatively large voltage drop across resistor 116. This resistor forms a portion of a voltage divider circuit comprised of resistors 116, 118, and 122, connected between ground and a C+ voltage supply source. The normal voltage across transistor 116 is applied to an indicator circuit I which serves to provide a warning signal such as to the vehicle operator when the voltage across resistor 116 falls below its normal level. When the short term time delay circuit completes its time out function, as described above, to turn on transistor 112, diode 120 will effectively ground the junction between resistors 116 and 118 so that the indicator circuit I will respond to this condition and provide a warning signal to the vehicle operator. When the skid signal terminates, a positive voltage is applied through diode 106 to recharge capacitor 100 and thereby turn off transistors 104 and 112, increasing the voltage across resistor 116 and thereby de-energize the indicator circuit I.

Long Term Skid Signal Timing Circuit

The long term skid signal timing circuitry is illustrated in the lower portion of FIG. 2 and includes an RC timing circuit comprised of resistor 130 and capacitor 132 with the junction therebetween being connected to the anode of a unijunction transistor 134. Normally, the anode voltage is held at approximately ground potential through resistor 130 and resistor 136. However, when a positive skid signal is received, it is applied through resistor 130 to charge capacitor 132. As capacitor 132 charges, the anode voltage of transistor 134 becomes more positive and when it exceeds the gate voltage, as determined by a voltage divider comprised of resistors 140 and 142 connected between ground and a B+ voltage supply source, the transistor 134 will be gated into conduction. This permits capacitor 132 to discharge through the anode to cathode path of the transistor and develop a voltage across resistor 144 to pulse a silicon control rectifier 146 into conduction through resistor 148. When rectifier 146 is conducting, current flows from a C+ voltage supply source through a resistor 150 and thence through the anode to cathode circuit of rectifier 146 to develop a voltage across a loading resistor 154. This will provide base drive to turn on transistor 156 which becomes latched. This provides a path of current flow from the C+ voltage supply source, in the valve driver section VD, and thence through resistor 74, diode 114 and a diode 160 and through the collector to emitter path of transistor 156 to ground. This removes the base drive for transistor 66, in the valve driver section, to thereby turn off the power transistors 62 and 64, preventing energization of the valve solenoid VS.

When transistor 156 is pulsed into conduction by silicon controlled rectifier 146, the junction of resistors 116 and 118 is referenced to essentially ground potential. This, then, will lower the voltage across resistor 116 sufficiently to cause indicator circuit I to provide a warning to the vehicle operator. The warning indicator I will be energized and the valve solenoid VS will be disabled until the long term timing circuit is reset. The system is reset by turning the power off.

Sensor Continuity

The continuity of the wheel speed sensor circuits WS-1 and WS-2 is checked by applying a low DC test current to each sensor coil. Thus, with reference to FIG. 1 it will be noted that current flow is established through sensor coil 12, of the wheel speed sensor WS-1, from the B+ voltage supply source and then through resistor 20, through the coil 12 and thence through a resistor 22 to a B- voltage supply source. Similarly, current is also established through sensor coil 12 in the wheel sensor WS-2 from a B+ voltage supply source and through a resistor 20, through the coil and through resistor 22 to the B- voltage supply source. Resistors 20 in each of the differential input filters circuits DF-1 and DF-2 are relatively large, on the order of 680 kilohms and the B+ voltage is on the order of 15 volts. The sensor coil resistance is several orders less than the resistance of the current source and hence, the result is a small positive offset voltage on the output of operational amplifier 26 in each of the differential filter circuits DF-1 and DF-2. If either sensor circuit becomes open circuited, the output voltage taken from the associated amplifier 26 will swing high and this output voltage is then coupled through diode 50 to the monitor circuit MC.

In the monitor circuit illustrated in FIG. 2, this output voltage is applied across input resistor 136 to the long term timing circuit. This will cause capacitor 132 to be charged through resistor 130 in the manner described hereinbefore and if the loss of sensor continuity continues sufficiently long, transistor 134 will be turned on to disable and latch the system to an off condition.

Solenoid Open

The valve solenoid VS is checked for an open circuit condition by establishing a low DC trickle or test current through the solenoid coil. This is obtained from a C+ voltage supply source and thence, through a resistor 180 which has a resistance which is several orders greater than that of the solenoid coil, a diode 182, the solenoid coil and thence through resistor 92 to ground. So long as an open circuit does not take place in this path, the junction of resistor 180 and diode 182 is held at a low potential (diode 184 is in a blocking condition). If an open circuit takes place, the ground path will be eliminated and consequently, the junction of resistor 180 and diode 182 will go high, thereby applying a positive potential through diode 186 to the long term timing circuit to charge capacitor 132 through resistor 166. If the open circuit condition continues sufficiently long, the timing circuit will time out. The indicator circuit I will be energized and the valve solenoid coil VS will be disabled in the manner as described hereinbefore.

Shorted Solenoid

A shorted condition of the solenoid VS is detected with the use of a comparator circuit incorporating an operational amplifier 190. One end of the solenoid coil is connected through a resistor 192 to the inverting input of the amplifier and the non-inverting input of the amplifier is connected through resistors 194 and 96 to the C+ voltage supply source. Resistors 192 and 194 together with a capacitor 196 serve to filter the input to the comparator to avoid noise due to flyback voltage from the solenoid coil. A DC voltage is established by the test current flowing through the coil from the C+ voltage supply source, through resistor 180 and diode 182 and then through the coil and resistor 92 to ground. This voltage is compared against a reference voltage supplied to the non-inverting input of the amplifier from a voltage divider comprised of resistors 94 and 96 connected in series with resistor 92 between ground and the C+ voltage supply source. When the solenoid coil is shorted, the output of amplifier 190 will go high sufficiently to apply a positive voltage through diode 198 to the long term timing circuit to charge capacitor 132 in the manner described hereinbefore. Once the timing circuit times out, the system is disabled and latched and the indicator circuit I is energized.

MONITOR CIRCUITRY OF FIG. 3

Reference is now made to FIG. 3 which illustrates an embodiment of the invention similar to that as described hereinabove with reference to FIG. 2. In many respects the two circuits are similar and consequently, where appropriate, similar components in FIG. 3 will be identified with similar character references to assist in understanding the invention. In this embodiment of the invention, a valve driver circuit VD' receives a positive skid signal from the skid control logic circuit SL (FIG. 1) and then energizes the valve solenoid coil VS' to provide brake release. The valve solenoid coil is energized for a time duration dependent upon the duration of the skid signal.

The valve driver circuit VD' is illustrated in the upper portion of FIG. 3 to which reference is now made. This circuit includes a power transistor 200 which has its emitter to collector circuit connected in series with the solenoid VS' to ground. When this transistor is turned on, current will flow from a C+ voltage supply source through the emitter to collector circuit of the transistor and thence through the solenoid coil. A diode 202 is connected across the coil to protect the circuit from solenoid flyback voltage when the solenoid is de-energized. Power transistor 200 is controlled by a normally non-conductive logic transistor 204. Transistor 204 is an NPN transistor and has its collector connected to a C+ voltage supply source through a diode 206 and a resistor 208. The junction of resistor 208 and diode 206 is connected through a current limiting resistor 210 to the base of the PNP power transistor 200. Consequently, so long as transistor 204 is in a non-conducting condition, a positive reverse biasing potential is applied to the base of transistor 200 to ensure that this transistor will not be in a conducting condition.

A positive skid signal obtained from the skid control logic circuit SL (see FIG. 1) is applied to the valve driver circuit VD' through a diode 212 and thence through a resistor 214 to drive transistor 204 into conduction. This also causes transistor 216 to be driven into conduction through resistor 220 so that current will flow from the B+ voltage supply source through a resistor 218 and through the collector to emitter path of the transistor to ground. With transistor 204 being driven into conduction, transistor 200 will be biased into conduction permitting current to flow from the C+ voltage supply source and thence, through the emitter to collector path of transistor 200 and through the solenoid coil VS+ to ground. The solenoid coil will remain energized for a time duration dependent upon the duration of the positive skid signal.

Excessive Skid Signal

The monitor circuit of FIG. 3 employs a time delay circuit which, upon receipt of a skid signal, times a fixed time duration. This, for example, is on the order of 2.0 seconds. Then, the skid control system is disabled by blowing a fuse. The timing circuit includes an RC timer comprised of a capacitor 221 and a resistor 223. Normally, transistors 204 and 216 in the valve driver VD' are non-conducting. The junction of resistor 223, diode 224 and resistor 226 is at essentially ground potential. However, upon receipt of a skid signal, transistors 204 and 216 are driven into conduction, presenting essentially a ground potential on the collector of transistor 216. This is applied through a resistor 230 to provide forward biasing potential to a PNP transistor 232 in the monitor circuit. Transistor 232 will now conduct and current will flow from a B+ voltage supply source through the emitter to collector path of transistor 232 and thence through resistor 223 to charge capacitor 221. As capacitor 221 is charged, the anode potential of unijunction transistor 234 is increased in a positive direction through diode 236. When the anode potential of transistor 234 exceeds that of its gate potential, as determined by a B+ voltage supply source and resistors 238 and 239, the transistor will conduct. Current will be discharged from the capacitor, through diode 236 and thence through the anode to cathode circuit of transistor 234 to pulse a silicon controlled rectifier 244 into conduction. This will provide essentially a short circuit, causing fuse F to be blown.

Sensor Continuity

Sensor continuity is checked by the monitor circuit of FIG. 3 in essentially the same manner as that discussed hereinabove with respect to the monitor circuit of FIG. 2 and consequently, only the differences in two circuits will be described herein in detail. As discussed with reference to FIG. 2, if either sensor coil 12 in the wheel speed sensor WS-1 and WS-2 is open circuited, the corresponding operational amplifier 26 in circuit DF-1 or DF-2 will swing high, applying a positive voltage signal to the monitor circuit. This positive signal is applied through an isolation filter 250 to the anode of unijunction transistor 234, causing this transistor to conduct to pulse transistor 244 into conduction to blow a fuse F. The isolation filter circuit 250 is comprised of resistors 252, 254, capacitor 256 and diodes 258 and 260. These components define a filter to isolate the timing circuit in the monitoring circuit from the AC signal present at the junction of diodes 50 in the differential input filter circuits DF-1 and DF-2.

Solenoid Open

The valve solenoid VS' in FIG. 3 is checked for an open circuit condition in a manner quite similar to that described hereinbefore with reference to FIG. 2. Thus, an open circuit condition is checked by establishing a low DC trickle current through the solenoid coil. This is obtained from a C+ voltage supply source through a resistor 260 and a diode 262 and then through the coil VS' to ground. So long as an open circuit condition does not exist in this path, the junction of diode 262 and resistor 260 is held at a relatively low voltage. If the ground path is eliminated, due to an open circuit, the junction of resistor 260 and diode 262 will go high causing a positive voltage to be applied through diode 266 to the RC timing circuit in the monitor circuit. Consequently, capacitor 221 will be charged through resistor 225 until the charge is sufficient to cause transistor 234 to be conductive. This will pulse silicon control rectifier 244 into conduction to blow fuse F. When the solenoid coil VS' is energized, diode 262 is reverse biased. However, the junction between this diode and resistor 260 is held low by a ground path established through diode 268.

Solenoid Shorted

A shorted condition of the solenoid VS' in FIG. 3 is detected in a manner similar to that described hereinabove with respect to the circuitry in FIG. 2. Specifically, a shorted condition of this solenoid coil is detected with the use of a comparator circuit incorporating an operational amplifier 290. One end of the solenoid coil is connected through a resistor 292 to the inverting input of the amplifier and the non-inverting input of the amplifier is connected to a reference point, taken from the junction of resistors 294 and 296 which form a voltage divider between ground and a C+ voltage supply source. If the solenoid becomes short circuited, the output of amplifier 290 will go high to apply a positive potential through diode 298 to the timing circuit in the monitor circuit. This will cause capacitor 221 to be charged sufficiently to turn on unijunction transistor 234 to pulse silicon control rectifier 244 into conduction, thereby blowing fuse F. Resistor 292 and capacitor 300 serve to filter the input to the operational amplifier 290 to avoid noise problems resulting from the flyback voltage when the solenoid coil VS' is de-energized.

SUMMARY

In summation, it is seen that both embodiments of the monitor circuit described hereinabove with reference to FIGS. 2 and 3 include circuitry for determining whether a loss of continuity has taken place in either wheel sensor circuits WS-1 and WS-2. Also, both monitor circuits have provisions for determining whether an excessively long skid signal has been provided by the skid logic circuit SL. Still further, both circuits include circuitry for checking both open and shorted conditions of the valve solenoid coil.

Although the invention has been described in conjunction with specific embodiments, it is to be appreciated that various modifications may be made thereto within the spirit and scope of the present invention as defined by the appended claims.

We claim:

1. A skid control system for use with a vehicle having at least first and second spaced apart independently rotatable wheels and a braking system for applying braking forces to said wheels and comprising:
   brake control means responsive to a skid signal for controlling said braking system to release the braking forces on said wheels;
   means for providing first and second wheel speed signals respectively representative of the wheel speeds of said first and second wheels;
   logic circuit means for utilizing said first and second wheel speed signals to determine therefrom an incipient skid condition of at least one of said wheels and providing a said skid signal in dependence upon said determination;

said brake control means including energizable valve solenoid coil means for, when energized, acting upon said braking system to release braking forces on said wheels and valve driver circuit means responsive to a skid signal for energizing said valve solenoid coil means; and monitor means for disabling said valve driver circuit means in response to detection of an erroneous operating characteristic and comprising means for applying a DC test current of a magnitude insufficient to energize said valve solenoid coil means to flow through said coil means to develop a test voltage thereacross, first test circuit means for diverting said test current to flow in a first signal path when said valve solenoid coil means develops an open circuit fault, second test circuit means for producing a signal current in a second signal path when a short circuit of said valve solenoid coil means reduces said test voltage below a predetermined threshold, means including a third current path for combining said first and second signal current paths so that either an open circuit or short circuit fault produces a fault signal current in said third current path, and circuit means for disabling said valve driver circuit means in dependence upon said fault signal current in said third path.

2. A skid control system as set forth in claim 1 including time delay means for timing a given period of time before disabling said valve driver circuit means in response to a said fault signal current.

3. A skid control system as set forth in claim 2 including fuse means associated with said valve driver means and means for permanently disabling said valve driver means by blowing said fuse means in response to a said fault signal current.

4. A skid control system as set forth in claim 1 and wherein said second test circuit means includes voltage comparator means for comparing said test voltage with a reference voltage and providing a said signal current in said second signal path when said reference voltage exceeds said test voltage, and timing means for timing a given time duration in response to a said fault signal current before disabling said valve driver circuit means.

5. A skid control system as set forth in claim 1 and wherein said test current applying means includes resistance means connected in series with said valve solenoid coil means and exhibiting a greater resistance than that of said valve solenoid coil means so that said test current flows through a series circuit including said resistance means and said valve solenoid coil means, said first test circuit means for diverting said test current including means for increasing the magnitude of the voltage developed across said coil means between said resistance means and said coil means from a normal low potential when there is no open circuit condition to a higher potential upon the existence of an open circuit condition, and means for applying said higher potential signal to said combining means.

6. A skid control system as set forth in claim 5 and wherein said monitor means includes means for producing a routine signal when the voltage on said valve solenoid coil means is high because of routine energization of said coil instead of an open circuit, and diode means for connecting said routine signal with said first test circuit means to prevent said fault signal current upon such routine energization, whereby false alarms are reduced.

7. A skid control system as set forth in claim 5, including time delay means for timing a given time duration in response to a said fault signal current before disabling said valve driver circuit means.

8. A skid control system for use with a vehicle having at least first and second spaced apart, independently rotatable wheels and a braking system for applying braking forces to said wheels and comprising:

brake control means responsive to a skid signal for controlling said braking system to release the braking forces on said wheels;

means for providing first and second wheel speed signals respectively representative of the wheel speed of said first and second wheels;

logic circuit means for utilizing said first and second wheel speed signals to determine therefrom an incipient skid condition of at least one of said wheels and providing a skid signal in dependence upon a said determination;

said wheel speed signal-providing means including first and second wheel speed sensors, each said wheel speed sensor comprising rotor means adapted to be mounted to a vehicle wheel for rotation therewith and stator means including at least one sensor coil means located proximate to said rotor means for providing a cyclically varying signal exhibiting a frequency dependent upon the angular velocity of said rotor means, means for conditioning said cyclically varying signal to make the amplitude of its successive cycles substantially constant, said signal-conditioning means having an input and an output and comprising means for transmitting DC signals also, and means for utilizing the conditioned frequency signal from said output to provide a said wheel speed signal;

means for monitoring the electrical continuity of a said sensor coil means and including means for applying a DC test current to said sensor coil means so as to flow therethrough and establish a DC test voltage thereacross at least while said vehicle is moving, said DC test voltage being connected with said input of said signal-conditioning means, and means connected with said output of said signal-conditioning means and responsive to a variation in the magnitude of said DC test voltage for providing a fault signal representative of a loss of electrical continuity.

9. A skid control system as set forth in claim 8 and wherein said test current applying means includes a resistor connected in series with said sensor coil means and exhibiting a resistance greater than that of said sensor coil means so that when said coil means is continuous, the test voltage developed across said coil means due to said test current is relatively small, and wherein said system further comprises control circuit means responsive to a said fault signal for effectively disabling said brake control means.

10. A skid control system as set forth in claim 9 wherein said brake control means includes valve solenoid means for, when energized, acting upon said braking system to release braking forces on said wheels, and valve driver circuit means responsive to a said skid signal for energizing said valve solenoid means; and wherein said control circuit means responsive to a said fault signal comprises means for disabling said valve driver circuit means so as to be non-responsive to a said skid signal.

11. A skid control system as set forth in claim 10 including time delay means responsive to a said fault signal for timing a predetermined period of time before disabling said valve driver circuit means.

12. A skid control system as set forth in claim 8 and wherein said signal conditioning means comprises amplifier means and said test current applying means includes a resistor connected in series with said sensor coil means with said resistor exhibiting a greater resistance than that of said coil means whereupon a relatively low DC test voltage is normally applied across said coil means in the absence of an open circuit condition thereof, and means for connecting the junction of said resistor and said coil means with one input of said amplifier means to provide an amplifier output signal dependent upon voltage developed across said coil means, said amplifier means providing said fault signal as a relatively extreme DC output signal in the event of an open circuit condition of said coil means.

* * * * *

UNITED STATES PATENT OFFICE
CERTIFICATE OF CORRECTION

PATENT NO. : 3,920,284
DATED : November 18, 1975
INVENTOR(S) : E.J.Lane; D.T.Klien; S.Geppert It is certified that error appears in the above—identified patent and that said Letters Patent are hereby corrected as shown below:

Col. 3, line 16: After 1973, insert "now abandoned".

line 19: Delete "now abandoned".

Signed and Sealed this first Day of June 1976

[SEAL]

Attest:

RUTH C. MASON
Attesting Officer

C. MARSHALL DANN
Commissioner of Patents and Trademarks